(12) United States Patent
Schajer et al.

(10) Patent No.: US 7,003,894 B2
(45) Date of Patent: Feb. 28, 2006

(54) SURFACE PROFILE MEASUREMENT, INDEPENDENT OF RELATIVE MOTIONS

(75) Inventors: Gary Stephen Schajer, Vancouver (CA); Javier Ignacio Gazzarri, Vancouver (CA)

(73) Assignee: Forintek Canada Corp., Vancouver (CA)

( * ) Notice: Subject to any disclaimer, the term of this patent is extended or adjusted under 35 U.S.C. 154(b) by 32 days.

(21) Appl. No.: 10/802,336

(22) Filed: Mar. 18, 2004

(65) Prior Publication Data

US 2005/0204572 A1    Sep. 22, 2005

Related U.S. Application Data

(60) Provisional application No. 60/454,603, filed on Mar. 17, 2003.

(51) Int. Cl.
    *G01B 5/207* (2006.01)
(52) U.S. Cl. .......................................... 33/552; 33/553
(58) Field of Classification Search ............. 33/522, 33/1 Q, 521, 549, 551, 553, 554, 555
    See application file for complete search history.

(56) References Cited

U.S. PATENT DOCUMENTS

| | | | | |
|---|---|---|---|---|
| 4,288,855 A | * | 9/1981 | Panetti | 33/1 Q |
| 4,573,131 A | | 2/1986 | Corbin | |
| 5,280,719 A | * | 1/1994 | Noss | 73/146 |
| 6,108,924 A | * | 8/2000 | Jang et al. | 33/552 |
| 6,427,353 B1 | * | 8/2002 | Nelson et al. | 33/552 |
| 6,648,708 B1 | * | 11/2003 | Monks | 33/552 |
| 6,701,633 B1 | * | 3/2004 | Ohtsuka | 33/552 |

* cited by examiner

*Primary Examiner*—Christopher W. Fulton
(74) *Attorney, Agent, or Firm*—Oyen Wiggs Green & Mutala LLP.

(57) ABSTRACT

A general method is disclosed for using distance sensors to measure the surface profile and twist of objects, even in the presence of rigid-body motions in the measurement directions between the surface and the sensors. The method involves making multiple sequential measurements from a group of sensors while the object moves longitudinally relative to the sensors. The surface height features of the measured object appear in delayed sequence as the observed surface moves longitudinally relative to the sensor array. However, any rigid-body motions in the measurement directions appear simultaneously at all sensors. Mathematical procedures are used to separate the delayed and simultaneous components of the measurements, from which the surface height profile is determined. The invention can handle many different measurement types, including simultaneous measurement of the surfaces of two-sided objects, measurement of surface twist and two-dimensional surface scanning.

20 Claims, 4 Drawing Sheets

Six-sensor arrangement for two-sided measurements.

FIGURE 1. Surface profile measurement, (a) using a single sensor, (b) using multiple sensors.

FIGURE 2. Four-sensor arrangement for one-sided measurements.

FIGURE 3. Distance profiles measured by sensors d-c-b-a and the calculated surface profile.

FIGURE 4. Six-sensor arrangement for two-sided measurements.

FIGURE 5. Six-sensor arrangement for parallel one-sided measurements.

FIGURE 6. Eight-sensor arrangement for parallel two-sided measurements.

FIGURE 7. Two line-type distance sensors used to make two-dimensional surface topographic measurements.

SURFACE PROFILE MEASUREMENT, INDEPENDENT OF RELATIVE MOTIONS

This application claims priority from U.S. Provisional Application 60/454,603 entitled "Surface Profile Measurement, Independent of Relative Motions" filed Mar. 17, 2003.

TECHNICAL FIELD

This invention relates to a method and apparatus that can measure the surface profile and twist of one or both sides of an object that is moving longitudinally relative to the apparatus, independent of rigid-body motions in the measurement direction. Such measurements are useful for surface quality control of manufactured products, for example sawn lumber and rolled metals, and for extended surfaces such as railroad rails and highway pavements.

BACKGROUND OF THE INVENTION

Surface profiling is an important need in many industrial and scientific applications. Typical examples include flatness inspection of railway rails and road surfaces, and quality control of manufactured products such as sawn lumber and rolled metal.

Figure 1:
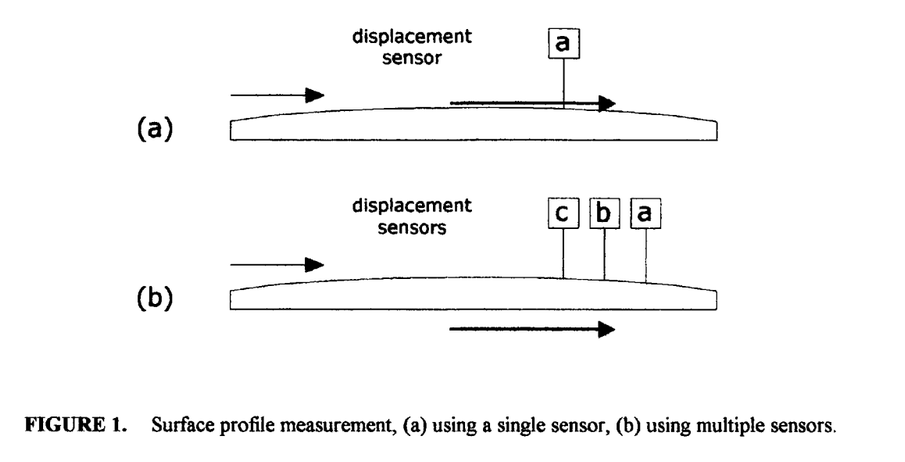
FIG. 1. Surface profile measurement, (a) using a single sensor, (b) using multiple sensors.

The simplest way to measure surface height profile is to make a series of measurements with a distance sensor while relatively moving the measured object and the sensor in a straight line perpendicular to the measurement direction. FIG. 1(a) schematically shows an example arrangement. The drawback to this method is that deviations from straight-line motion cause relative displacements in the measurement direction that are indistinguishable from measured surface shape. Thus, very accurate linear motion is essential.

In many cases, accurate linear motion is not practicable. For example, when measuring the surface profile of a long length of railway track, it is not feasible to provide a separate linear slide for moving the sensor. Instead, the sensor must travel on the irregular track that it is measuring. Existing non-inertial techniques focus on the surface curvature because it can be identified independently of relative displacements or rotations. A typical arrangement uses three or more sensors operating simultaneously, as shown in FIG. 1(b). U.S. Pat. No. 4,288,855 describes examples of this concept. The sensors estimate the local surface curvature from the second finite difference of their measurements. The curvature values are integrated twice to determine the surface profile. This method is effective, but it has difficulty resolving surface features that are either greatly shorter or greatly longer than the total spacing of the sensors.

U.S. Pat. No. 5,280,719 describes an apparatus that uses a large number of equally spaced sensors. The apparatus seeks to identify long surface features by overlapping sets of measurements that are made at successive intervals much less than the total spacing of the sensors. However, the large number of sensors that are required creates a large cost and maintenance burden. U.S. Pat. No. 4,573,131 describes a method of using just four sensors to achieve the same objective. The sensors make successive measurements at small intervals of travel. The sensor spacings are chosen so that the numbers of intervals of travel between successive sensors have no common factors other than unity. This feature avoids the existence of "nulls", which is a measurement artifact whereby surface features with specific wavelengths are not observed. The method described in U.S. Pat. No. 4,573,131 is based on the assumption that successive sensors reaching the same point along the measured line have the same distance from the measured surface. This is typically not a reasonable assumption, and the described method has only limited effectiveness.

An alternative approach, the "inertial" method, uses an accelerometer that runs at a constant speed along the surface to be profiled, giving a signal that is proportional to surface curvature. This signal is integrated twice to obtain the surface shape. Conceptual simplicity makes this an attractive method. However, there are also some practical limitations. The first concerns the high frequencies that need to be measured. These can extend beyond the capabilities of the accelerometer. A second limitation is the assumption that the accelerometer and the surface are permanently in contact. This is difficult to achieve reliably, especially at high scanning speeds due to the large inertial forces that act on the system. Finally, only smooth profiles can be measured. A sharp step, for example, would not be detected properly.

None of the above techniques is well suited to measuring the surfaces of two-sided objects. At best, they can measure each of the two sides separately, but they do not provide accurate thickness information. Similarly, they do not provide accurate twist information with parallel measurements, nor are they suitable for two-dimensional surface evaluations.

BRIEF SUMMARY OF THE INVENTION

The present invention provides an improved method for measuring surface height profile that overcomes the limitations of previous art. The invention involves using multiple distance sensors operating simultaneously. The main difference from previous designs is the way in which the sensor measurements are combined to determine the desired surface height profile, and in the flexibility of the possible geometrical arrangements that can be used to achieve particular measurement objectives.

The central idea of the present invention is the observation that surface height features appear in delayed sequence as the observed surface moves longitudinally relative to the sensor array. However, any relative motions in the measurement direction, either translational or rotational, appear simultaneously at all sensors. Modern mathematical procedures are used to separate the delayed and simultaneous components of the measurements, from which the surface height profile is determined.

One of the advantages of the proposed method is that it is able to resolve both fine details and long wavelengths. It also enhances measurement accuracy by exploiting the geometrical relationships that exist among successive measurements, and by averaging the redundant information from multiple sensors. In addition, the proposed method is able to reconstruct the entire length of the scanned surface. This is in contrast to the curvature method, where the extremes are lost because neighboring points are used to make each curvature calculation. The underlying idea of the present invention is very flexible, and it can easily be adapted to simultaneously measuring the surfaces of two-sided objects. Further possibilities include measurement of surface twist and two-dimensional surface scanning.

DETAILED DESCRIPTION OF THE INVENTION

To simplify the description, it is supposed that the distance sensors remain stationary and that the measured object moves. However, it is apparent that the description also applies to the case of a stationary object and moving sensors.

Figure 2:
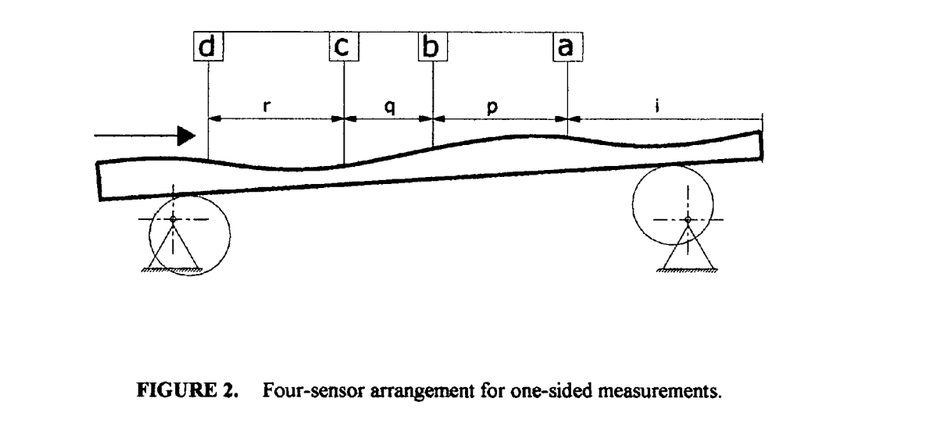
FIG. 2. Four-sensor arrangement for one-sided measurements.

FIG. 2 schematically shows an example sensor arrangement. In this case, there are four distance sensors arranged in a row. However, the invention is not limited to this specific arrangement. Other arrangements with fewer or more sensors in one or more rows, on the same or opposite sides of the measured object, are also useful. The distance sensors can be of any suitable type, chosen according to the needs of the particular application. Example sensor types include, but are not limited to, laser triangulation, ultrasound, eddy current, LVDT sensors, etc. For notational convenience, the sensors are labeled a, b, c and d, in the reverse sequential order that they are reached by the moving object.

FIG. 2 schematically shows a simple roller conveyor system. This is included in the diagram to assist conceptual understanding, but it is not part of the present invention. Almost any means of longitudinally moving the measured object could be suitable. The arrangement of eccentrically mounted rollers in FIG. 2 symbolically indicates that relative motions in the measurement direction do not need to be avoided.

The conveyor system in FIG. 2 includes a means for measuring the longitudinal motion of the moving object. Any accurate measuring means is acceptable; for example, a rotary encoder attached to a conveyor roll. The encoder readings are used to trigger simultaneous measurements from the distance sensors, at regular small intervals along the measured object. It is preferable that the sensor spacing should be an integer number of these intervals. To avoid the presence of "nulls" (an inability to detect surface features with specific wavelengths), the numbers of measurement intervals within at least two of the sensor spacings should have no common factors other than unity. These conditions are desirable, but not essential. Satisfactory operation can often be achieved even if they are not obeyed.

As an example, consider the case of an object of total length equal to n−1 measurement intervals (=n measured points). Let $u_i$ be the heights of the measured points on the surface of the object relative to a datum line fixed on or adjacent to the object. The index i is in the range $1 \leq i \leq n$, starting at the end of the object which reaches sensor a first. Let $w_i$ be the corresponding position of the datum line relative to the distance sensors. Further, let $z_i$ be the rotation of the datum line at the moment when point i is being measured by sensor a. Any specific center of rotation is potentially acceptable for defining $w_i$ and $z_i$. A desirable choice is the midpoint of the length spanned by the distance sensors because it improves the stability of the subsequent mathematical calculations. For dimensional consistency, the quantity $z_i$ is defined as the rotation angle in radians multiplied by half the length spanned by the set of distance sensors. Without any loss in generality, the initial quantities $w_1$ and $z_1$ can be arbitrarily assigned zero values. This assignment provides the definition of the position and orientation of the datum line.

The geometry in FIG. 2 creates an inversion of the measured surface data. An increase in surface height causes a decrease in distance sensor reading. To avoid possible confusion, it is convenient to define "height" quantities of the kind:

$$a_i = h - a^*_I \quad (1)$$

where $a^*_I$ is the measured distance of the surface from sensor "a", h is a "reference" distance. The exact value chosen for h is not critical. For example, the average value of $a^*_I$ would be a reasonable choice. However, the value(s) of h chosen for the other sensor(s) cannot be chosen with similar freedom. They should be such that all measured "heights" would be equal for the case of a flat object moving parallel to the sensor array.

For the arrangement shown in FIG. 2, the sensor measurements are related to the surface profile and the rigid-body motions in the measurement direction through the equations:

$$a_i = u_i + w_i + w_i + (0-m)z_i$$

$$b_i = u_{i+p} + w_i + (p-m)z_i/2$$

$$c_i = u_{i+p+q} + w_i + (p+q-m)z_i/2$$

$$d_i = u_{i+p+q+r} + w_i + (p+q+r-m)z_i/2 \quad (2)$$

where p, q and r are the numbers of measurement intervals between distance sensors a, b, c and d, respectively, and $m=(p+q+r)/2$.

The relationships between the quantities in equations (2) are purely geometrical, and can be expressed in matrix form. For example, when n=9 and p=1, q=2, r=1:

$$\begin{bmatrix} 1 & & & & & & & & & & & & & \\ & 1 & & & & & 1 & & & & -1 & & & \\ & & 1 & & & & & 1 & & & & -1 & & \\ & & & 1 & & & & & 1 & & & & -1 & \\ & & & & 1 & & & & & 1 & & & & -1 \\ \hline 1 & & & & & & & & & & & & & \\ & 1 & & & & & 1 & & & & -.5 & & & \\ & & 1 & & & & & 1 & & & & -.5 & & \\ & & & 1 & & & & & 1 & & & & -.5 & \\ & & & & 1 & & & & & 1 & & & & -.5 \\ \hline 1 & & & & & & & & & & & & & \\ & 1 & & & & & 1 & & & & .5 & & & \\ & & 1 & & & & & 1 & & & & .5 & & \\ & & & 1 & & & & & 1 & & & & .5 & \\ & & & & 1 & & & & & 1 & & & & .5 \\ \hline 1 & & & & & & & & & & & & & \\ & 1 & & & & & 1 & & & & 1 & & & \\ & & 1 & & & & & 1 & & & & 1 & & \\ & & & 1 & & & & & 1 & & & & 1 & \\ & & & & 1 & & & & & 1 & & & & 1 \end{bmatrix} \begin{bmatrix} u_1 \\ u_2 \\ u_3 \\ u_4 \\ u_5 \\ u_6 \\ u_7 \\ u_8 \\ u_9 \\ \hline w_2 \\ w_3 \\ w_4 \\ w_5 \\ \hline z_2 \\ z_3 \\ z_4 \\ z_5 \end{bmatrix} = \begin{bmatrix} a_1 \\ a_2 \\ a_3 \\ a_4 \\ a_5 \\ \hline b_1 \\ b_2 \\ b_3 \\ b_4 \\ b_5 \\ \hline c_1 \\ c_2 \\ c_3 \\ c_4 \\ c_5 \\ \hline d_1 \\ d_2 \\ d_3 \\ d_4 \\ d_5 \end{bmatrix} \quad (3)$$

corresponding to:

$$A \cdot f = g \quad (4)$$

where f is a vector comprising the surface profile and relative motion results, and g is a vector comprising the measured distance data. Matrix A clearly demonstrates the nature of the measurements. The leftmost block of columns illustrates the delayed sequence of the surface profile data, while the center and rightmost columns of blocks show the simultaneous character of the relative motion data. For mathematical uniqueness, equation (3) excludes the redundant columns corresponding to $w_1=0$ and $z_1=0$.

At every measurement point, there are three unknown quantities to be determined, $u_i$, $w_i$ and $z_i$. Thus, while it is possible to start measurements when the object reaches the first distance sensor, it is desirable to wait until at the object reaches at least three sensors. In practice, it is convenient to wait until the object reaches all available sensors. In this case, each of the sensors makes the same number of readings on the object. Under these conditions, the number of unknown quantities f in equation (4) equals $3n-2(p+q+r+1)$, and the number of measured quantities in g is $4(n-p-q-r)$. For $n>2(p+q+r-1)$, there is an excess of data over unknowns. This is desirable because the excess data can be used to reduce the effect of measurement errors. Under these conditions, equation (4) can be solved by the least-squares method using the "Normal Equations":

$$A^T A \cdot f = A^T g \quad (5)$$

For the example case in equation (3), the Normal Equations are:

$$\begin{bmatrix} 1 & & & & & & & & & & & & & & & & \\ & 2 & & & & & & & & & & & & & & & \\ & & 2 & & & & & & & & & & & & & & \\ & & & 3 & & & & & & & & & & & & & \\ & & & & 4 & & & & & & & & & & & & \\ & & & & & 3 & & & & & & & & & & & \\ & & & & & & 2 & & & & & & & & & & \\ & & & & & & & 2 & & & & & & & & & \\ & & & & & & & & 1 & & & & & & & & \\ \hline 1 & 1 & & 1 & 1 & & & & & 4 & & & & 0 & & & \\ & 1 & 1 & & 1 & 1 & & & & & 4 & & & & 0 & & \\ & & 1 & 1 & & 1 & 1 & & & & & 4 & & & & 0 & \\ & & & 1 & 1 & & 1 & 1 & & & & & 4 & & & & 0 \\ \hline -1 & -.5 & & .5 & 1 & & & & & 0 & & & & 2.5 & & & \\ & -1 & -.5 & & .5 & 1 & & & & & 0 & & & & 2.5 & & \\ & & -1 & -.5 & & .5 & 1 & & & & & 0 & & & & 2.5 & \\ & & & -1 & -.5 & & .5 & 1 & & & & & 0 & & & & 2.5 \end{bmatrix} \begin{bmatrix} u_1 \\ u_2 \\ u_3 \\ u_4 \\ u_5 \\ u_6 \\ u_7 \\ u_8 \\ u_9 \\ \hline w_2 \\ w_3 \\ w_4 \\ w_5 \\ \hline z_2 \\ z_3 \\ z_4 \\ z_5 \end{bmatrix} = \begin{bmatrix} a_1 \\ a_2+b_1 \\ a_3+b_2 \\ a_4+b_3+c_1 \\ a_5+b_4+c_2+d_1 \\ b_5+c_3+d_2 \\ c_4+d_3 \\ c_5+d_4 \\ d_5 \\ \hline a_2+b_2+c_2+d_2 \\ a_3+b_3+c_3+d_3 \\ a_4+b_4+c_4+d_4 \\ a_5+b_5+c_5+d_5 \\ \hline -a_2-.5b_2+.5c_2+d_2 \\ -a_3-.5b_3+.5c_3+d_3 \\ -a_4-.5b_4+.5c_4+d_4 \\ -a_5-.5b_5+.5c_5+d_5 \end{bmatrix} \quad (6)$$

For small values of n, a general matrix equation solver is sufficient to solve the Normal Equations. Matrix $A^T A$ is symmetrical, so some computational economy can be achieved by using a specialized solver for symmetric matrices. For larger values of n, iteration techniques, for example the Gauss-Seidel method, are useful.

Figure 3:
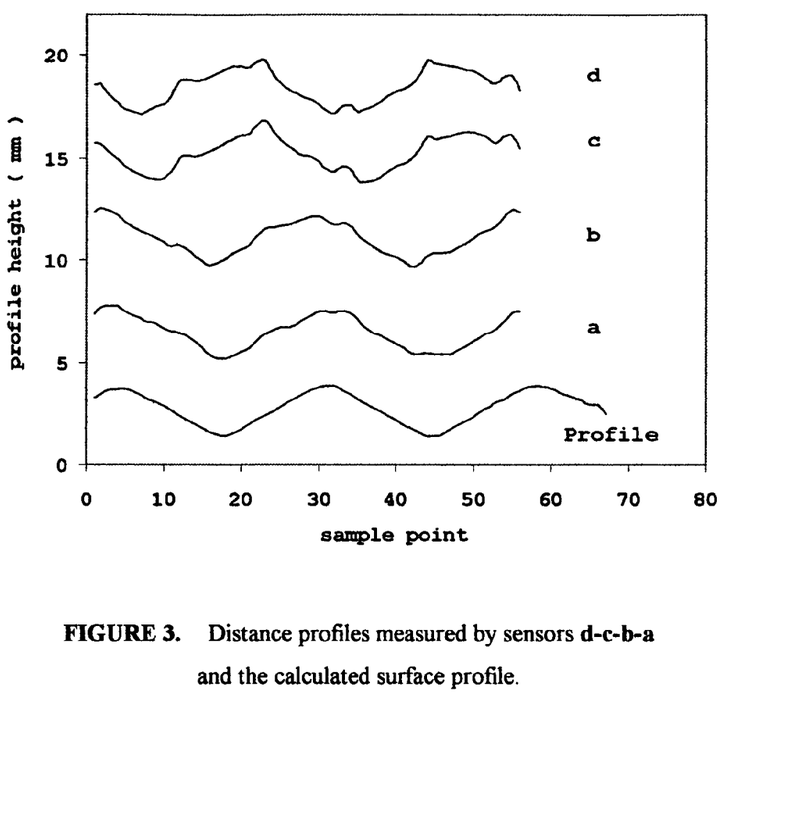
FIG. 3. Distance profiles measured by sensors d-c-b-a and the calculated surface profile.

FIG. 3 shows an example measurement made using the arrangement shown in FIG. 2. In this example, n=67, p=2, q=7, r=2. To make clear the effectiveness of the method, a small steps was attached to one of the rollers so that the measured object moved along an obviously irregular path through the roller system. The first four traces show the sensor readings and the fifth profile the computed surface profile. This profile corresponds accurately to the actual curved profile of the measured object, and successfully eliminates the effects of the rigid-body motions in the measurement direction. In addition, the full length of the object has been measured, even though each individual sensor measured less than the entire length.

In general, it is desirable to use more than the minimum number of distance sensors that will give an excess of data over unknowns. The least-squares method will then have an averaging effect on the computed profile, and reduce the effects of random measurement errors. When high accuracy is required, the use of more sensors is an appropriate choice. Matrix A becomes fuller, but the size of $A^T A$ in equation (5) remains the same and no new ideas are required.

When cost is a critical factor, and more modest accuracy is acceptable, it is possible to use fewer than the "minimum" number of sensors, for example three, or even two, instead of the four shown in FIG. 2. In this case, there will be fewer data than unknowns. It may also occur that for some reason it is not possible to avoid having common factors in at least two sensor spacings. Both of these cases cause equation (5) to become singular. This circumstance can be handled by using "regularization", a mathematical process which introduces smoothing.

Several regularization techniques are commonly used, among them truncation and filtering. A convenient technique is Tikhonov regularization. The procedure involves modifying matrix $A^T A$ in equation (5) to penalize extreme values in the solution. The penalty can be applied to the norm of the model, thereby creating a "small" solution, or to the norm of the numerical first or second derivatives of the model, respectively creating "flat" or "smooth" solutions. The simplest form of Tikhonov regularization adds an extra term to the Normal Equations, as follows:

$$(A^T A + \beta B^T B)f = A^T g \quad (7)$$

where $\beta$ is a weighting factor called the regularization parameter. Matrix B is the identity, first or second derivative operator, chosen according to whether a "small", "flat" or "smooth" model solution is desired. In general, a "smooth" model is a reasonable choice because it is the most responsive to measurement noise.

The Morozov discrepancy principle can be used to identify the optimal value of the regularization parameter $\beta$. If the standard errors, $\sigma$, in the data are all equal, independent and Gaussian with zero mean, the optimum parameter $\beta$ makes the norm of the misfit between the actual measured distances and the distances corresponding to the calculated solution equal to the standard error of the distance measurements. In this case:

$$\left[\frac{\|Af - g\|}{\sigma}\right]^2 = N \quad (8)$$

If the standard errors in the measured distances may not be assumed to be equal, then appropriate weighting factors are required. In that case, the Morozov discrepancy principle requires that the chi-squared statistic equals N.

Given an estimate of the standard error in the measured data, $\sigma$, equations (7) and (8) can be solved iteratively. The result is not sensitive to modest variations in $\beta$, so accurate convergence is not necessary. This tolerance is attractive because it could remove the need to evaluate $\beta$ for every profile. For stable and consistent applications, it may be sufficient to use a fixed value of $\beta$ that is updated only periodically.

Equation (7) applies to the simplest case where only one type of regularization is used, and equal weighting is applied to all elements of the model vector. For specialized applications, equation (7) can be expanded to use all three types simultaneously, with individual matrices to indicate the weighting parameters for each regularization type and element in the model vector.

It should be noted that regularization enables a surface profile to be calculated when a mathematical solution many not otherwise be possible. It may also be used to provide smoothing for a noisy solution. However, in neither case does it create any new information. Therefore, it is not a substitute for data from additional distance sensors.

Figure 4:
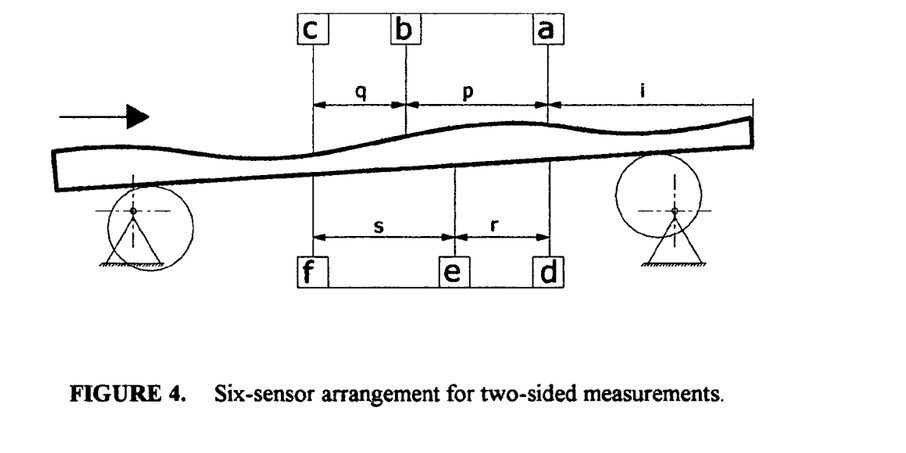
FIG. 4. Six-sensor arrangement for two-sided measurements.

The idea behind this invention can be exploited further to allow efficient two-sided profiling using a sensor arrangement such as is shown in FIG. 4. The attraction of this arrangement is that the upper and lower sensors observe the same rigid-body motions as the single-sided arrangement shown in FIG. 2. This commonality between of both sets of sensors means that only one new variable is introduced, namely the lower surface profile. Thus, a minimum of one additional lower sensor is required to provide the needed additional data, far fewer than needed for two independent profile measurements.

In the arrangement shown in FIG. 4, one sensor has been transferred from the upper surface, and two further sensors have been added. Although the sixth sensor is not essential, it is included here to provide a symmetrical arrangement with similar expected measurement accuracy for both sides of the measured object. The additional sensor provides redundant data that is averaged with all the other data. This feature enhances the measurement accuracy for both sides.

For the arrangement in FIG. 4, the relationships of the sensor readings to the surface profiles and rigid-body motions are:

$$a_i = u_i + w_i + (0-m)z_i$$

$$b_i = u_{i+p} + w_i + (p-m)z_i$$

$$c_i = u_{i+p+q} + w_i + (p+q-m)z_i$$

$$d_i = v_i - w_i + (0-m)z_i$$

$$e_i = v_{i+r} - w_i + (r-m)z_i$$

$$f_i = v_{i+r+s} - w_i + (r+s-m)z_i \quad (9)$$

where $m = (p+q)/2 = (r+s)/2$. The equations involve one new surface profile variable, $v_i$, but no additional rigid-body motions. These equations can be expressed in matrix form, analogous to equation (3), from which the surface profiles can be calculated. As previously, at least two sensor spacings should not have any common factors other than unity. The skew-symmetric arrangement in FIG. 4 is not essential, but is chosen to avoid any left-to-right bias. An important feature of the use of the present invention for two-sided profiling is that it preserves geometrical thickness relationships, even in the presence of possible errors in identifying rigid-body motions. Thus, the advantages of conventional thickness measuring techniques are retained.

Exploitation of common components in the measurements from multiple sensors can be carried a further step. Practical objects are often quite wide in the direction out of the paper in FIG. 1. In such cases, it can be of interest to measure the surface profile along parallel lines on one or both opposing surfaces. The availability of parallel profiles along a surface gives more than just multiple measurements of surface topography. The difference between the profiles gives twist, which is a geometric property of significant interest. Parallel profiling introduces a third significant rigid-body motion in addition to the rigid-body displacement and rotation considered so far, namely, rotation around the longitudinal axis of the measured object.

Figure 5:
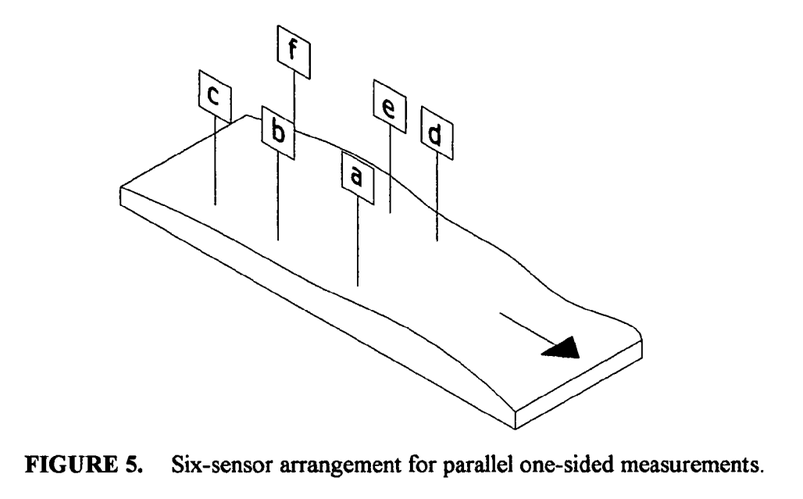
FIG. 5. Six-sensor arrangement for parallel one-sided measurements.

Parallel profile measurements are possible for both one- and two-surface profiling. FIG. 5 shows an arrangement of six sensors to do one-surface profiling along two parallel paths. As before, a symmetrical arrangement has been chosen so that equal measurement accuracy is expected for each measured profile. In this case, the number of sensors used equals the minimum required to achieve a full-rank matrix.

For the sensor arrangement shown in FIG. 5, the relationships of the sensor readings to the surface profiles and rigid-body motions are:

$a_i = u_i + w_i - y_i + (0-m)z_i$ $b_i = u_{i+p} + w_i - y_i + (p-m)z_i$ $c_i = u_{i+p+q} + w_i - y_i + (p+q-m)z_i$ $d_i = v_i + w_i + y_i + (0-m)z_i$ $e_i = v_{i+r} w_i + y_i + (r+m)z_i$ $f_i = v_{i+r+s} + w_i + y_i + (r+s-m)z_i$ (10)

where $u_i$ and $v_i$ are the two parallel surface profiles, $m=(p+q)/2=(r+s)/2$, and $y_i = \phi \Delta/2$ corresponds to the rigid-body rotation around the longitudinal axis of the measured object by an angle $\phi$, with a distance $\Delta$ between the parallel paths. As before, these equations can be expressed in matrix form, analogous to equation (3), from which the surface profiles can be calculated.

Figure 6:
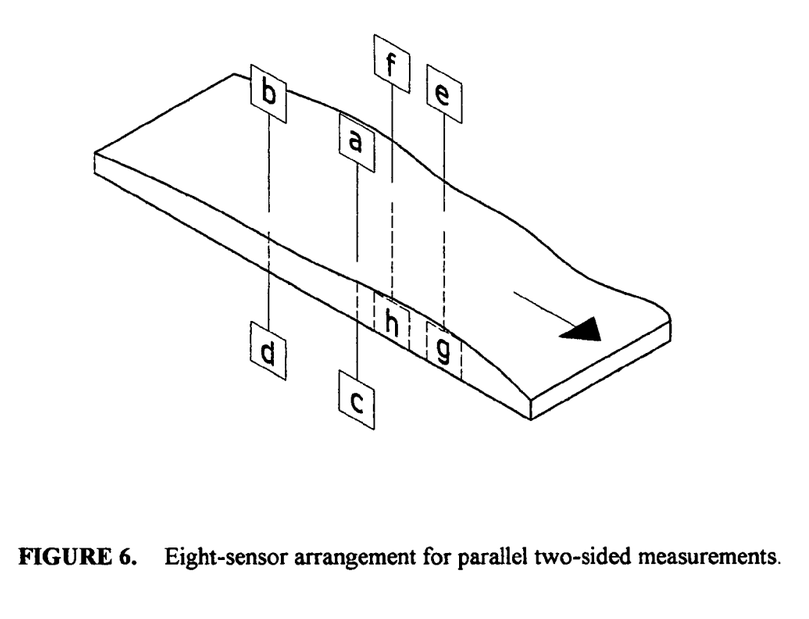
FIG. 6. Eight-sensor arrangement for parallel two-sided measurements.

FIG. 6 shows a sensor arrangement that uses eight sensors to do parallel profiling along four lines adjacent to the edges of a rectangular object. This arrangement combines the measurement features of FIG. 4 and FIG. 5

Figure 7:
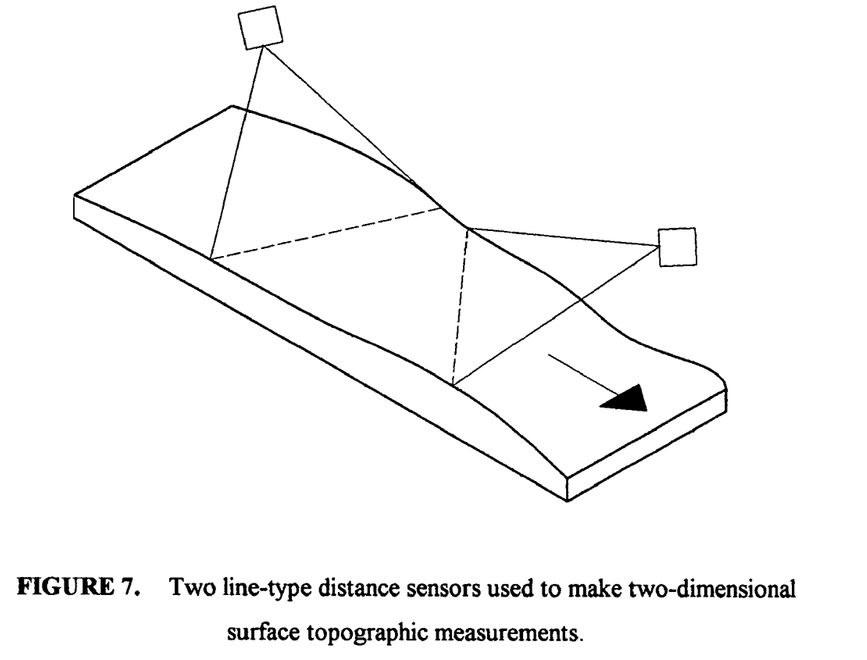
FIG. 7. Two line-type distance sensors used to make two-dimensional surface topographic measurements.

FIG. 7 shows another useful measurement arrangement. In this example, two line-type distance sensors replace the single-point-type previously discussed. These sensors measure distance at a sequence of many points along two lines across the surface of the measured object. To avoid "nulls" in the subsequent computations, the lines should not be parallel to each other. The attractive feature of the sensor arrangement in FIG. 7 is its ability to identify a two-dimensional topographic map of the surface height of the measured object, independent of rigid-body motions. Clearly, the amount of data to be handled from the line-type distance sensors in FIG. 7 is much larger than from single-point-type. However, the procedures for working with those data still involve the same principles of instantaneous observation of rigid-body motions, and delayed observation of surface features. Thus, the mathematical calculations follow the same patterns as previously described, with some adaptations to allow for the possible non-integral number of measurement intervals between corresponding pixels along the measured lines.

Commonly, the number of measurements made, using either single-point-type or line-type distance sensors, can be very large. In some cases, for example, when measuring road surface profiles, the measured object has "infinite" length, resulting in an indefinitely large number of measurements. In such cases, evaluation of matrix $A^T A$ for solution of equation (5) or (7) is not practicable. Instead, a progressive iterative solution method can be used, where the first part of the matrix is solved before all the remaining parts are available.

The first step when formulating a progressive solution is to reorder the variables from the arrangement shown in equation (6). The original arrangement was chosen because it reveals the matrix structure. However, sequential arrangements of the form $f=[u_1 \; w_1 \; z_1 \; u_2 \; w_2 \; Z_2 \ldots]^T$ and $g=[a_1 \; b_1 \; c_1 \; d_1 \; a_2 \; b_2 \; c_2 \; d_2 \ldots]^T$ are more practical for iterative solutions. Even for whole-matrix solutions, the sequential arrangements are desirable because they reduce matrix bandwidth.

The following is an example progressive iterative solution method for equation (6), based on the Gauss-Seidel method. Successive over-relaxation could additionally be used.

Initial Estimate for the First 5 Data Sets:

$w_1 = 0 \; z_1 = 0 \; u_1 = a_1$

For i=2 ... 5: $z_i = 0 \; w_i = (a_5 - d_1)(i-1)/4 \; u_i = a_i - w_i$ (11)

Iteration Scheme:

For j=6 ... measure next $a_j \; b_j \; c_j \; d_j$ $z_j = z_{j-1} \; w_j = w_{j-1} \; u_{j+4} = d_j - w_j - z_j$ $u_{j+3} = [d_{j-1} - w_{j-1} - z_{j-1} \; c_j - w_j - 0.5 \; z_j]/2$ $u_{j+2} = [d_{j-2} - w_{j-2} - Z_{j-2} + c_{j-1} - w_{j-1} - 0.5 \; z_{j-1}]/2$ $u_{j+1} = [d_{j-3} - w_{j-3} - z_{j-3} + c_{j-2} - w_{j-2} - 0.5 \; z_{j-2} b_j - w_j + 0.5 z_j]/3$ For $i = j \ldots j-k$ (counting in reverse)

$z_i = [-(a_i - u_i) - 0.5(b_i - u_{1+i}) + 0.5(c_i - u_{3+i}) + (d_i - u_{4+i})]/2.5$ $w_i = [(a_i - w_i) + (b_i - u_{l+i}) + (c_i - u_{3+i}) + (d_i - u_{4+i})]/4$

When $4 < i \; u_i = [(a_j - w_i + z_i) + (b_{i-1} - w_{i-1} + 0.5 \; z_{i-1}) + (c_{i-3} - w_{i-3} - 0.5 z_{i-3}) + (d_i - u_{i-4} - z_{i-4})]/4$ When $3 < i \leq 4 u_i = [(a_j - w_i + z_i) + (b_{i-1} - w_{i-1} + 0.5 z_{i-1}) + (c_{i-3} - w_{i-3} - 0.5 z_{i-3})]/3$ When $1 < i \leq 3 u_i = [(a_j - w_i + z_i) + (b_{i-1} - w_{i-1} + 0.5 z_{i-1})]/2$ When $i \leq 1$ skip (12)

The variable k controls the number of iterations used to refine the solved quantities. Larger values give more accurate answers, but at the the expense of computational effort. A value of k slightly larger than p+q+r typically gives acceptable results.

It is apparent that the ideas that constitute this invention can be applied to meet a wide range of measurement needs. Such needs may be met by using various numbers and types of distance sensors with various geometrical arrangements. The present disclosure describes the basic principles of the present invention, and gives many practical details. It is evident that a person skilled in the art could use these principles and details to construct a surface profile measuring device that varies in particular details from the specific examples described herein. It is also evident that such a person could also employ mathematical methods different from the examples presented here to achieve the same or similar numerical results, for example, using transforms. All such variations lie within the scope of this invention.

We claim:

1. A method for determining one or more surface profiles of an object, the method comprising the steps of:

moving said object and a plurality of distance sensors relative to one another in a longitudinal direction, each one of said sensors arranged to measure the distance from itself to a surface of said object;

measuring the relative longitudinal motion between said object and said distance sensors;

for each surface, taking a plurality of distance measurements with each one of said sensors as said object and said sensors are moved relative one another, each one of said measurements taken simultaneously by all of said sensors, the sensors thereby providing distance measurement data reflecting a series of measurements, said distance measurement data having a first component relating to the particular surface profile features of said object and a second component relating to rigid body relative motions of said object in the measurement direction relative to said sensors;

analyzing said measurement data to identify said rigid body relative motion component of said data; and determining said surface profile of said object by separating said rigid body relative motion component of said measurement data from said measurement data, leaving said surface profile feature component, wherein said rigid body motion component of said data is determined by identifying motion fluctuations of said object measured simultaneously at said sensors.

2. The method of claim 1, wherein said plurality of sensors are arranged on more than one side of said object, to provide data relating to more than one surface of said object.

3. The method of claim 1, wherein said plurality of sensors are arranged on opposite sides of said object, to provide data relating to two opposite surfaces of said object.

4. A system for carrying out the method of claim 1 to measure the surface profile of an object independent of relative motions of the object, the system comprising:

a plurality of distance sensors arranged along two or more parallel lines, the sensors arranged to make distance measurements on at least one surface of said object in a measurement direction, the object and the arrangement of said distance sensors being movable relative to one another in a direction different from said measurement direction, each individual sensor making a plurality of distance measurements at pre-determined spaced intervals along the surface of said object when said object is moved relative said arrangement of sensors, thereby enabling substantially similar points on the object to be measured by different sensors within a sequence of measurements; wherein said pre-determined spaced intervals are smaller than the relative spacings between said sensors.

5. The system of claim 4 wherein the sequence of the spacings between sensors fixed along different parallel lines are not the same when viewed in the direction of relative motion of the object.

6. The system of claim 4, wherein the sensors are arranged in a skew-symmetrical pattern of spacings.

7. A system according to claim 4, further comprising two pluralities of sensors, one for making measurements to each opposite surface of said object, wherein said two pluralities of distance sensors are arranged along two or more parallel lines facing opposite surfaces of said object.

8. A system according to claim 4, specifically configured to measure parallel profiles and twist along a surface of an object, wherein said plurality of distance sensors are arranged along two or more parallel lines facing the same surface of said object.

9. A system according to claim 4, specifically configured to measure parallel surface profiles, thickness profiles and twist of an object, further comprising a plurality of sensors arranged along two or more parallel lines, where said distance sensors are arranged along several parallel lines facing the two or more surfaces of said object.

10. A system according to claim 4, specifically configured to measure two-dimensional surface shape, where a plurality of line-type distance sensors measure non-parallel lines across one or more surfaces of an object.

11. A data processing system for processing measurement data in the method of claim 1, the data processing system identifying surface profiles from features that appear in corresponding sensor data in delayed sequence, and any relative rigid-body motions in the measurement direction from features that appear simultaneously in the sensor data, the identification of delayed and simultaneous features achieved by solution of a matrix equation.

12. The data processing system of claim 11 wherein the matrix equation is of the following types:

$$a_i = u_i + w_i + (0-m)z_i$$

$$b_i = u_{i+p} + w_i + (p-m)z_i/2$$

$$c_i = u_{i+p+q} + w_i + (p+q-m)z_i/2$$

$$d_i = u_{i+p+q+r} + w_i + (p+q+r-m)z_i/2$$

where $u_i$ is the surface height at point i, $w_i$ is the relative displacement in the measurement direction between the object and the sensor array, $z_i$ is the relative rotation of the object relative to the sensor array, and where p, q and r are the numbers of measurement intervals between distance sensors a, b, c and d, respectively, and $m=(p+q+r)/2$; and $$A \cdot f = g$$

where f is a vector comprising the surface profile and relative motion results, and g is a vector comprising the measured distance data, and with the matrix contents adjusted to apply to the specific geometrical arrangement of the distance sensors used.

13. The data processing system according to claim 11 where the simultaneous equations are arranged in matrix format:

$$A \cdot f = g$$

where matrix A contains the coefficients of the quantities $u_i$, $w_i$, and $z_i$, vector g contains the measured distance data, and vector f contains the desired quantities to be determined.

14. A data processing system according to claim 11 where result stabilization or smoothing is achieved by using regularization.

15. A data processing system according to claim 14 where the regularization type is Tikhonov regularization.

16. A data processing system according to claim 11, where evaluation of the surface profile is achieved using a matrix solution method after data collection has been completed.

17. A data processing system according to claim 11, where evaluation of the surface profile is achieved using a progressive solution method that may possibly be initiated before data collection has been completed.

18. A data processing system according to claim 17 where the progressive solution involves the Gauss-Seidel or successive over-relaxation methods.

19. A data processing system for processing measurement data in the method of claim 1, the data processing system identifying surface profiles from features that appear in corresponding sensor data in delayed sequence, and any relative rigid-body motions in the measurement direction from features that appear simultaneously in the sensor data, the identification of delayed and simultaneous features achieved by solution of "Normal" equations.

20. The data processing system of claim 19 wherein the "Normal" equations are of the following type:

$$A^T A \cdot f = A^T g$$

and $$\begin{bmatrix} 1 & & & & & & & & & & & & & & & & & \\ & 2 & & & & & & & & & & & & & & & & \\ & & 2 & & & & & & & 1 & -1 & & & & & & & \\ & & & 3 & & & & & & 1 & 1 & -.5 & -1 & & & & & \\ & & & & 4 & & & & & & 1 & 1 & -.5 & -1 & & & & \\ & & & & & 3 & & & & 1 & 1 & 1 & .5 & & -.5 & -1 & & \\ & & & & & & 2 & & & 1 & 1 & 1 & 1 & .5 & & -.5 & & \\ & & & & & & & 2 & & & 1 & 1 & & 1 & .5 & & & \\ & & & & & & & & 1 & & & 1 & & & 1 & & & \\ \hline 1 & 1 & & 1 & 1 & & & & & 4 & & 0 & & & & & & \\ & 1 & 1 & & 1 & 1 & & & & & 4 & & 0 & & & & & \\ & & 1 & 1 & & 1 & 1 & & & & & 4 & & 0 & & & & \\ & & & 1 & 1 & & 1 & 1 & & & & & 4 & & 0 & & & \\ \hline -1 & -.5 & & .5 & 1 & & & & & 0 & & 2.5 & & & & & & \\ & -1 & -.5 & & .5 & 1 & & & & & 0 & & 2.5 & & & & & \\ & & -1 & -.5 & & .5 & 1 & & & & & 0 & & 2.5 & & & & \\ & & & -1 & -.5 & & .5 & 1 & & & & & 0 & & 2.5 & & & \end{bmatrix} \begin{bmatrix} u_1 \\ u_2 \\ u_3 \\ u_4 \\ u_5 \\ u_6 \\ u_7 \\ u_8 \\ u_9 \\ \hline w_2 \\ w_3 \\ w_4 \\ w_5 \\ \hline z_2 \\ z_3 \\ z_4 \\ z_5 \end{bmatrix} = \begin{bmatrix} a_1 \\ a_2 + b_1 \\ a_3 + b_2 \\ a_4 + b_3 + c_1 \\ a_5 + b_4 + c_2 + d_1 \\ b_5 + c_3 + d_2 \\ c_4 + d_3 \\ c_5 + d_4 \\ d_5 \\ \hline a_2 + b_2 + c_2 + d_2 \\ a_3 + b_3 + c_3 + d_3 \\ a_4 + b_4 + c_4 + d_4 \\ a_5 + b_5 + c_5 + d_5 \\ \hline -a_2 - .5b_2 + .5c_2 + d_2 \\ -a_3 - .5b_3 + .5c_3 + d_3 \\ -a_4 - .5b_4 + .5c_4 + d_4 \\ -a_5 - .5b_5 + .5c_5 + d_5 \end{bmatrix}$$

with the matrix contents adjusted to apply to the specific geometrical arrangement of the distance sensors used.

* * * * *